United States Patent
Aksyuk et al.

(10) Patent No.: US 7,502,160 B2
(45) Date of Patent: Mar. 10, 2009

(54) SPECKLE REDUCTION IN LASER-PROJECTOR IMAGES

(75) Inventors: Vladimir A. Aksyuk, Westfield, NJ (US); Randy C. Giles, Whippany, NJ (US); Omar D. Lopez, Summit, NJ (US); Roland Ryf, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/681,376

(22) Filed: Mar. 2, 2007

(65) Prior Publication Data

US 2008/0212034 A1 Sep. 4, 2008

(51) Int. Cl.
*G02B 26/00* (2006.01)
*G02B 26/08* (2006.01)

(52) U.S. Cl. ...................... 359/290; 359/224

(58) Field of Classification Search .......... 359/197, 359/198, 214, 223–225, 290, 292, 298
See application file for complete search history.

(56) References Cited

U.S. PATENT DOCUMENTS

| | | | |
|---|---|---|---|
| 4,834,476 A | 5/1989 | Benton | 350/3.76 |
| 4,986,619 A | 1/1991 | Walker et al. | 350/3.61 |
| 5,172,251 A | 12/1992 | Benton et al. | 359/9 |
| 5,506,597 A | 4/1996 | Thompson et al. | 345/85 |
| 5,834,331 A | 11/1998 | Razeghi | 438/40 |
| 6,211,848 B1 | 4/2001 | Plesniak et al. | 345/1 |
| 6,323,984 B1 | 11/2001 | Trisnadi | 359/245 |
| 6,426,836 B2 | 7/2002 | Dorsel et al. | |
| 6,577,429 B1 | 6/2003 | Kurtz et al. | |
| 6,594,090 B2 | 7/2003 | Kruschwitz et al. | |
| 6,600,590 B2 | 7/2003 | Roddy et al. | |
| 6,625,381 B2 | 9/2003 | Roddy et al. | |
| 6,791,739 B2 * | 9/2004 | Ramanujan et al. | 359/279 |
| 6,876,484 B2 | 4/2005 | Greywall | |
| 6,902,276 B2 | 6/2005 | Glenn | |
| 6,984,917 B2 | 1/2006 | Greywall et al. | |
| 7,099,063 B2 | 8/2006 | Greywall | |

(Continued)

FOREIGN PATENT DOCUMENTS

EP 1 283 434 A2 2/2003

(Continued)

OTHER PUBLICATIONS

U.S. Appl. No. 12/017,984, filed Jan. 22, 2008, Gang Chen et al.

(Continued)

*Primary Examiner*—William C Choi

(57) ABSTRACT

A laser projector having a configurable spatial light modulator (SLM) adapted to display various spatial modulation patterns and redirect illumination from a laser to form an image on the viewing screen. The laser projector drives the SLM to change spatial modulation patterns at a rate that causes the corresponding sequence of projected images to fuse to mitigate appearance of speckle in the resulting fused image. The SLM can be designed to redirect the illumination using either diffraction or specular reflection of light from the displayed spatial modulation pattern. In one embodiment, the SLM is a MEMS device having an array of individually addressable mirrors supported over a substrate and adapted to move (e.g., translate and/or rotate) with respect to the substrate.

27 Claims, 5 Drawing Sheets

U.S. PATENT DOCUMENTS

| | | | |
|---|---|---|---|
| 7,138,648 | B2 | 11/2006 | Kneissl et al. ............... 257/14 |
| 2004/0239880 | A1 | 12/2004 | Kapellner et al. ............ 353/20 |
| 2005/0219675 | A1 | 10/2005 | Aksyuk et al. .............. 359/224 |
| 2006/0066964 | A1 | 3/2006 | Greywall ................... 359/849 |
| 2006/0126151 | A1 | 6/2006 | Aksyuk et al. |
| 2006/0267449 | A1 | 11/2006 | Aksyuk et al. ............. 310/309 |
| 2007/0046907 | A1 | 3/2007 | Shin ......................... 353/119 |
| 2007/0279731 | A1 | 12/2007 | Blumberg .................. 359/291 |

FOREIGN PATENT DOCUMENTS

| | | | |
|---|---|---|---|
| EP | 1 734 771 | A1 | 12/2006 |
| WO | WO 2004/064410 | A1 | 7/2004 |

OTHER PUBLICATIONS

U.S. Appl. No. 12/017,440, filed Jan. 22, 2008, Gang Chen et al.
U.S. Appl. No. 12/009,991, filed Jan. 22, 2008, Gang Chen et al.
U.S. Appl. No. 12/009,851, filed Jan. 22, 2008, Gang Chen et al.
U.S. Appl. No. 11/765,155, filed Jun. 19, 2007, Roland Ryf.
"DC-DC Converter Basics" published on line at: http://www.powerdesigners.com/InfoWeb/design_center/articles/DC-DC/converter.shtm, 12 pages.
U.S. Appl. No. 11/713,483, filed Mar. 2, 2007, G. Chen et al.
U.S. Appl. No. 11/713,207, filed Mar. 2, 2007, R. Giles et al.
U.S. Appl. No. 11/713,155, filed Mar. 2, 2007, V. Aksyuk et al.
"PVPro Enabling personal video projectors", Light Blue Optics Ltd., available online at: www.lightblueoptics.com, (2006) 5 pages.
R.W. Gerchberg and W.O. Saxton, "Phase Determination from Image and Diffraction Plane Pictures in the Electron Microscope", OPTIK, vol. 34, No. 3 (1971), pp. 275-284.
R.W. Gerchberg and W.O. Saxton, "A Practical Algorithm for the Determination of Phase from Image and Diffraction Plane Pictures", OPTIK, vol. 35, No. 2 (1972), pp. 237-246.
"A Tail of Two Cats", published on line at: http://www.ysbl.youk.ac.uk/~cowtan/fourier/coeff.html, Dec. 15, 2006, 3 pages.
K. Greene, "Pocket Projectors" published on line at: http://www.technologyreview.com/BizTech/17860/, Technology Review, Dec. 6, 2006, 3 pages.
K. Greene, "Ultra-Colorful TV" published online at: http://www.technologyreview.com/read_article.aspx?id=17651&ch=infotech&sc=&pg=2, Technology Review, Oct. 24, 2006, pp. 1-4.
Lucente, Mark, "Diffraction-Specific Fringe Computation for Electro-Holography,"Ph.D Thesis, Dept. of Electrical Engineering and Computer Science, Massachusetts, Institute of Technology, available online at http://www.lucente.biz/pubs/PhDthesis/contents.html, Sep. 1994, abstract, table of contents, and pp. 13-174.
R. W. Gerchberg, "Super-resolution through error energy reduction", Optica Acta, 1974, vol. 21, No. 9, pp. 709-720.
"Novalux Delivers High-Power, Blue, Solid-State Light Sources to Consumer Electronics Partners", published on line at: http://novalux.com/company/press.php?release=5, Nov. 7, 2005, 2 pages.
"Single and Dual Panel LC Projection Systems," by M. G. Robinson, J. Chen, G. D. Sharp, Wiley, Chichester (England), 2005, Chapter 11, pp. 257-275.
"Perceived Speckle Reduction in Projection Display Systems" by Kerigan, SC et al., IP.com Journal, IP.com Inc., IP.com No. IPCOM000118774D; West Henrietta, NY, Jul. 1, 1997, XP-013106711.
"Some Fundamental Properties of Speckle" by J. W. Goodman, Journal of the Optical Society of America, American Institute of Physics, New York, vol. 66, No. 11, Nov. 1, 1976, pp. 1145-1150, XP-002181682.

* cited by examiner

SPECKLE REDUCTION IN LASER-PROJECTOR IMAGES

CROSS-REFERENCE TO RELATED APPLICATIONS

The subject matter of this application is related to that of: (i) U.S. patent application Ser. No. 11/713,483, entitled "COLOR MIXING LIGHT SOURCE AND COLOR CONTROL DATA SYSTEM" by Gang Chen, Ronen Rapaport, and Michael Schabel; (ii) U.S. patent application Ser. No. 11/713,207, entitled "DIRECT OPTICAL IMAGE PROJECTORS" by Randy C. Giles, Omar D. Lopez, and Roland Ryf; and (iii) U.S. patent application Ser. No. 11/713,155, entitled "HOLOGRAPHIC MEMS OPERATED OPTICAL PROJECTORS" by Vladimir A. Aksyuk, Robert E. Frahm, Omar D. Lopez, and Roland Ryf, all of which are being filed on the same date as the present U.S. Patent Application. The three above-identified U.S. Patent Applications are incorporated herein by reference in their entirety.

BACKGROUND OF THE INVENTION

1. Field of the Invention

The present invention relates to laser projection systems.

2. Description of the Related Art

The use of lasers in projection systems enables the creation of vibrant images with extensive color coverage that may be difficult to achieve by conventional (non-laser) light sources. One significant obstacle to laser image projection is the speckle phenomenon. Speckle arises when coherent light scattered from a rough surface, such as a screen, is detected by an intensity detector (e.g., a human eye) that has a finite aperture (e.g., a pupil). The finite aperture defines the spatial resolution of the detector and leads to quantization of the detected image into a mosaic of spots, the size of which is defined by the spatial resolution. For example, if light scattered from a spot on the screen interferes destructively at the detector's aperture, then that spot appears as a relatively dark spot in the detected image. On the other hand, if light scattered from a spot interferes constructively at the detector's aperture, then that spot appears as a relatively bright spot in the detected image. This apparent spot-to-spot intensity variation detected even when the screen is uniformly lit is referred to as speckle. Since speckle superimposes a granular structure on the perceived image, which both degrades the image sharpness and annoys the viewer, speckle reduction is highly desirable.

SUMMARY OF THE INVENTION

According to one embodiment, the present invention is an apparatus comprising: (i) a configurable spatial light modulator (SLM) to redirect illumination from a laser with a plurality of spatial patterns such that the redirected illumination projects an image on a viewing screen; and (ii) a controller adapted to drive the SLM to display a temporal sequence of spatial patterns selected from that plurality to mitigate appearance of speckle in the projected image.

According to another embodiment, the present invention is a method of reducing speckle. The method includes: (i) redirecting illumination from a laser with a plurality of spatial patterns displayed by a configurable SLM such that the redirected illumination projects an image on a viewing screen; and (ii) driving the SLM to display a temporal sequence of spatial patterns selected from that plurality to mitigate appearance of speckle in the projected image.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Speckle reduction is generally based on averaging two or more independent speckle configurations within the spatial and/or temporal resolution of the detector, such as the human eye. For the human eye, the averaging time can be deduced from a physiological parameter called the flicker fusion threshold or flicker fusion rate. More specifically, light that is pulsating at a rate lower than the flicker fusion rate is perceived by humans as flickering. In contrast, light that is pulsating at a rate higher than the flicker fusion rate is perceived as being steady. Flicker fusion rates vary from person to person and also depend on the individual's level of fatigue, the brightness of the light source, and the area of the retina that is being used to observe the light source. Very few people perceive flicker at a rate higher than about 75 Hz. In cinema and television, frame delivery rates between 20 and 60 Hz, e.g., 30 Hz, are normally used and, for the overwhelming majority of people, these rates are higher than the flicker fusion rate.

Independent speckle configurations may be produced using diversification of phase, propagation angle, polarization, and/or wavelength of the illuminating laser beam. One approach to achieving angle diversity is the use of a time-varying (e.g., vibrating) diffuser that causes the projection optics to sequentially illuminate sub-resolution areas inside the detector resolution spot at a rate higher than the flicker fusion rate. The sequential illumination effectively destroys the spatial coherence among the sub-resolution areas in the resolution spot, which suppresses interference effects within the resolution spot and reduces speckle contrast. Polarization diversity may be achieved, e.g., by using a projection screen that exhibits good depolarizing characteristics. A polarized laser beam incident on a depolarizing surface experiences depolarization due to multiple light scattering. The resulting speckle pattern can be decomposed into two patterns corresponding to two orthogonal polarization states. Since orthogonal polarization states are independent of one another, an automatic $1/\sqrt{2}$ speckle-contrast reduction occurs. Wavelength diversity reduces speckle contrast because, speckle is an interference phenomenon that depends on the wavelength of the illuminating light. For example, if two lasers whose wavelengths differ by an amount that is indistinguishable to the human eye produce the same image, then the image has a superposition of two independent speckle configurations and the overall speckle contrast should be reduced. Because phase, angle, polarization, and wavelength diversities are independent of one another, these techniques may be combined and used simultaneously and/or complementarily. Then, the resulting speckle-contrast reduction factor may be as large as the product of individual speckle-contrast reduction factors of the individual diversities employed.

Figure 1:
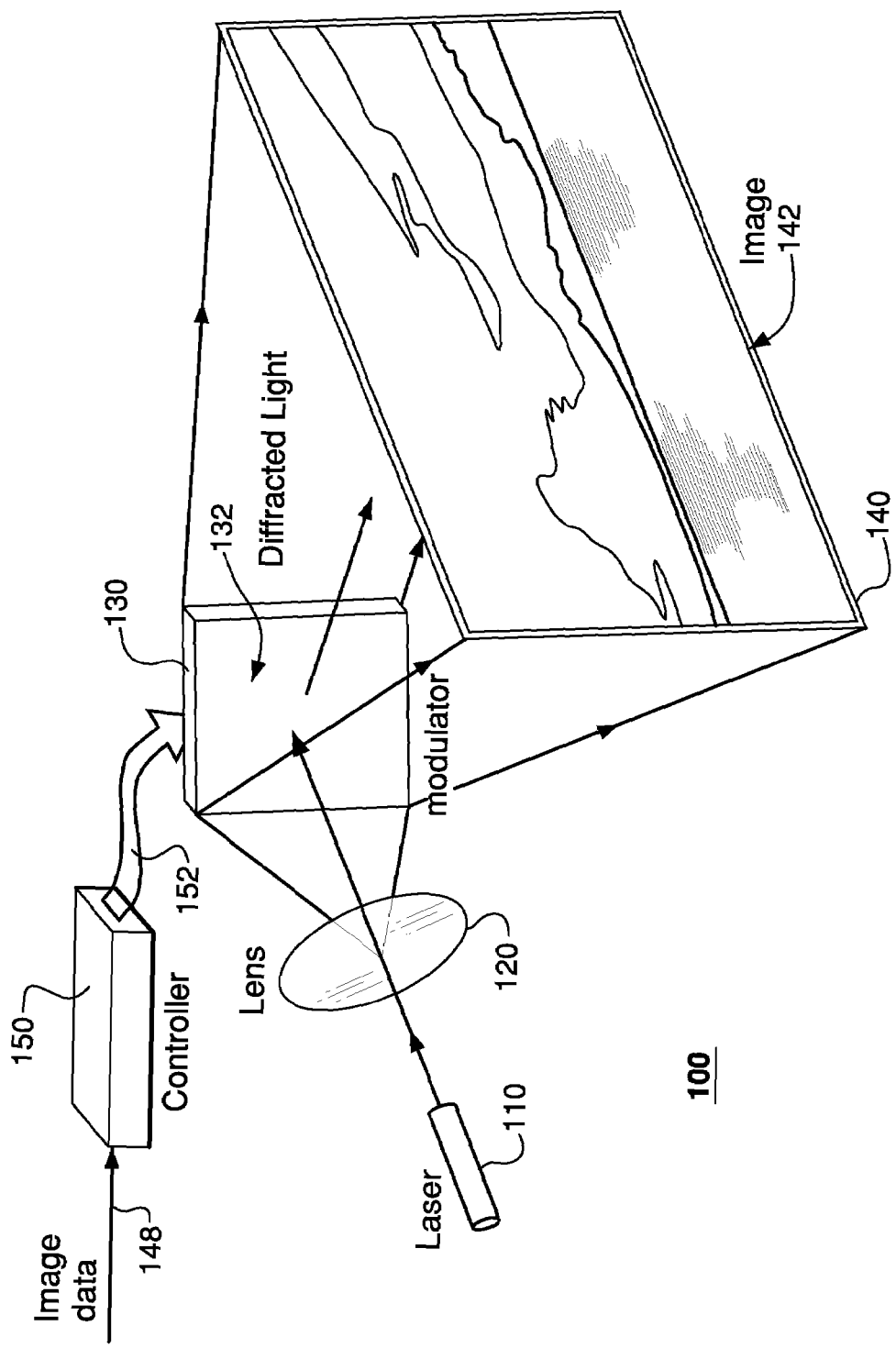
FIG. 1 shows a block diagram of a laser projection system according to one embodiment of the invention.

FIG. 1 shows a block diagram of a laser projection system 100 according to one embodiment of the invention. System 100 has a laser 110 that illuminates, through a lens 120, a spatial light modulator (SLM) 130. SLM 130 is configured to display a spatial modulation pattern 132 that encodes the image to be projected. For example, pattern 132 may act as a hologram that diffracts the incident light to generate a diffracted beam of light. The diffracted beam is projected onto a screen 140 to generate an image 142 corresponding to pattern 132. Depending on the diffraction efficiency of SLM 130, system 100 may also incorporate a spatial beam filter or mask (not shown) configured to reject the specularly reflected light and pass through only the diffracted light.

Pattern 132 is related to image 142 via a spatial Fourier transformation. Thus, to generate image 142 specified by image data 148, a controller 150 generates a Fourier transform for a light amplitude distribution of the image and outputs a corresponding control signal 152 to configure SLM 130 to display pattern 132 that approximates (in a discrete, spatially quantized form) the true mathematical Fourier transform. The process of light diffraction then generates an inverse Fourier transform of pattern 132, which reverses the Fourier transformation imposed by controller 150 and creates, in the diffracted beam, image 142 specified by image data 148.

In some embodiments, system 100 may generate images perceived as being multi-colored. In such embodiments, a temporal sequence of laser light beams of different colors (e.g., red, green, and blue) illuminate SLM 130. To generate the temporal sequence of different light colors, laser 110 may (i) have three or more appropriate integrated laser sources (not shown), each having a fixed wavelength, or (ii) be a tunable laser. Image data 148 specify a multi-color image by having two, three or more subsets of image data, each subset specifying a corresponding monochromatic sub-image. When the individual monochromatic sub-images are sequentially projected onto screen 140 at a rate higher than the flicker fusion rate, the viewer's eyes fuse the sequence of monochromatic sub-images to form the corresponding perceived multi-color image.

System 100 may have a number of significant advantages over conventional image projection systems. First of all, system 100 can produce images 142, which are in focus at substantially any distance from SLM 130. Moreover, there is no requirement for the projection surface, such as screen 140, to be flat, since pattern 132 can be appropriately modified to account for projection onto curved surfaces. Secondly, system 100 can be efficiently miniaturized, because it does not need complicated imaging optics. Finally, the diffractive nature of system 100 can significantly reduce light losses in the system compared to those occurring in conventional projection systems, which selectively block or diffuse light to produce images. For example, system 100 utilizing about 25 mW of optical power may produce an image having the same brightness as that of an image produced by a conventional projector utilizing about 100 mW of optical power.

Figure 2:
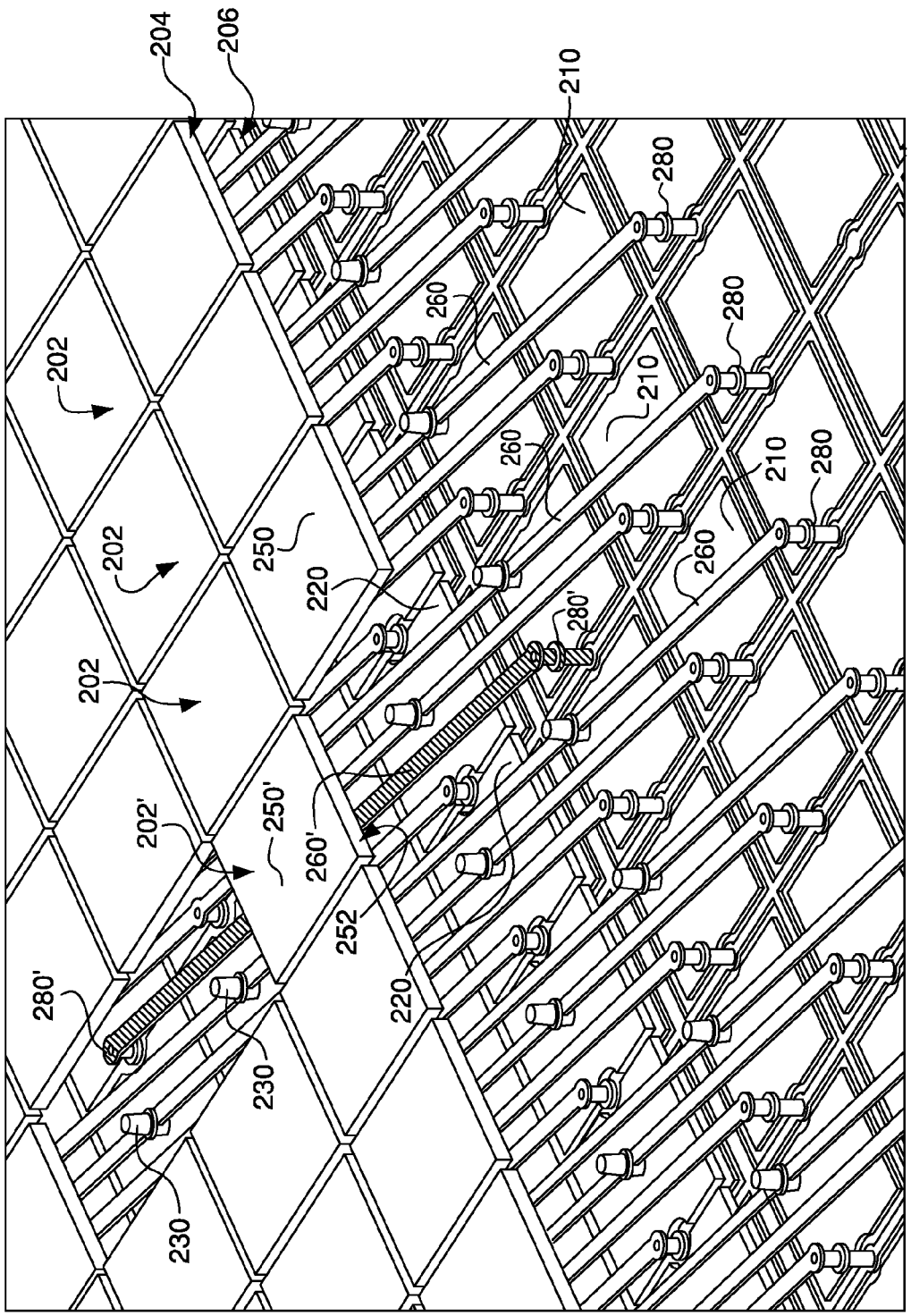
FIG. 2 shows a three-dimensional partial cutaway perspective view of an arrayed MEMS device that can be used as a spatial light modulator in the system shown in FIG. 1 according to one embodiment of the invention.

FIG. 2 shows a three-dimensional partial cutaway perspective view of an arrayed MEMS device 200 that can be used as SLM 130 according to one embodiment of the invention. Arrayed device 200 is generally analogous to a segmented MEMS mirror disclosed in commonly owned U.S. Patent Application Publication No. 2006/0126151, which is incorporated herein by reference in its entirety. Device 200 has a plurality of devices 202, each having a plate 250 coupled to a respective electro-mechanical actuator. Each electro-mechanical actuator has (i) a stationary electrode 210 attached to the substrate and (ii) a movable electrode 220 connected to a support pole 230, which is supported on the substrate by a spring (flexible beam) 260 attached between two anchors 280. When a voltage differential is applied between stationary electrode 210 and movable electrode 220, it generates an attractive electrostatic force between the electrodes causing the movable electrode to move toward the stationary electrode. Motion of movable electrode 220 (i) deforms spring 260, thereby generating a counteracting spring force, and (ii) is transferred to plate 250 via pole 230. When the voltage differential is removed, the spring force of deformed spring 260 returns movable electrode 220 and plate 250 into their initial positions.

Devices 202 are arrayed in device 200 such that plates 250 belonging to different devices 202 form a substantially contiguous segmented mirror 204, and each device 202 can be operated independent of any other device 202. As a result, when actuators of different devices 202 are appropriately biased to produce the corresponding plate displacements, segmented mirror 204 adopts a desired shape, e.g., that specified by control signal 152 (see FIG. 1). The characteristic response time for an individual device 202 is typically on the order of 10 µs. As such, segmented mirror 204 can be reconfigured to display about Y different spatial modulation patterns per second. Plates 250 can have appropriately small dimensions to enable segmented mirror 204 to act as a configurable phase mask or hologram suitable for generating spatial modulation patterns 132 in system 100. A detailed description of various additional embodiments of arrayed device 200 suitable for use as SLM 130 can be found in the above-cited '151 patent application publication.

Figure 3:
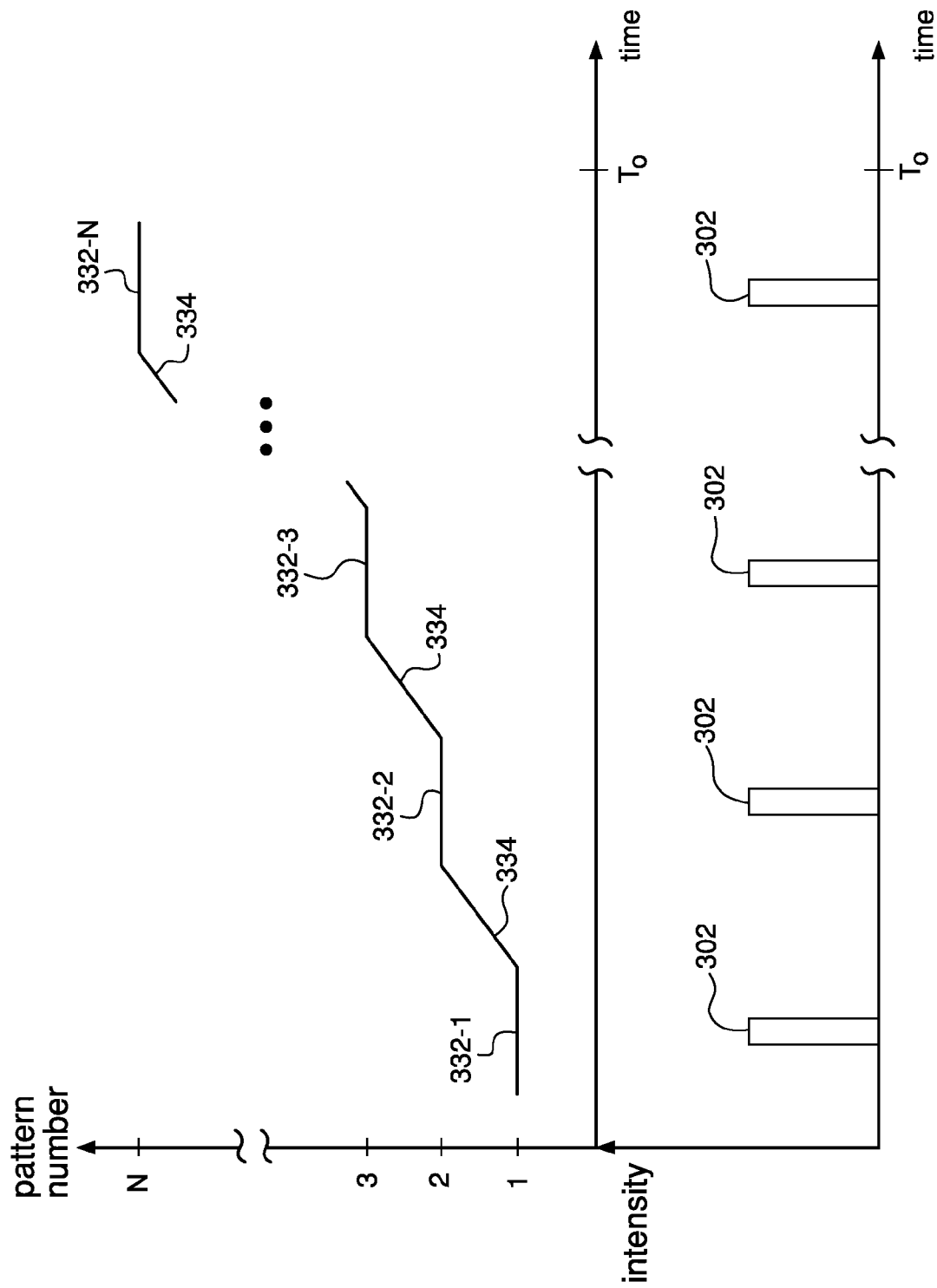
FIG. 3 graphically illustrates a method of reducing appearance of speckle in an image projected by the system of FIG. 1 according to one embodiment of the invention.

FIG. 3 graphically illustrates a method of reducing appearance of speckle in image 142 according to one embodiment of the invention. Generally, the perceived image 142 is defined by a spatial light intensity pattern on a viewing screen. Nevertheless, spatial light patterns that differ only by spatial phase patterns are typically perceived as the same image. In addition, two light patterns differing by features whose linear sizes are smaller than the resolution of the light detector, e.g., the eye, will typically be perceived as forming substantially the same images. If image 142 is discrete or quantized (e.g., due to a finite resolution), perceptually similar images 142 can generally be encoded by more than one hologram 132, where the number of holograms 132 producing similarly perceived images depends on the respective resolutions of image 142 and hologram 132. Hereinafter, such different patterns 132 that produce similarly perceived images 142 are referred to as redundant patterns. Each of those redundant patterns can create a different speckle configuration in the image while the image itself will remain substantially unchanged. If a plurality of redundant patterns 132 are projected onto the viewing screen within a time interval that is shorter than or equal to the reciprocal flicker fusion rate, then speckle-configuration averaging will typically occur in the eye thereby effecting speckle-contrast reduction.

The horizontal axes in FIG. 3 show time interval $T_0$ that is shorter than or equal to the reciprocal of the flicker fusion rate. During time interval $T_0$, system 100 projects N different copies of the same monochromatic still frame (specified by the corresponding data block of image data 148) using N different redundant patterns 132. More specifically, controller 150 computes N redundant patterns 132 corresponding to a single perceived single-color projected image based on image data 148. Each redundant pattern 132 is assigned an identification number and, in the top panel of FIG. 3, each redundant pattern is represented by a respective horizontal line 332-*j*, where j is the identification number. For the holding time of each redundant pattern 132 (length of each line 332-1 to 332-N in FIG. 3), SLM 130 displays the redundant pattern by keeping its pixels in a respective steady state for that particular redundant pattern 132. For example, in reference to FIG. 2, a steady state means that segmented mirror 204 as a whole and its individual plates 250 are substantially stationary. Each of slanted lines 334 in the top panel of FIG. 3 represents a transition process, during which the pixels of SLM 130 are being reconfigured from displaying redundant pattern 132-*j* to displaying redundant pattern 132-(*j*+1). In reference to FIG. 2, a transition process means that at least some plates 250 of segmented mirror 204 are moving from one stationary position to the next.

The bottom panel of FIG. 3 shows the timing of light pulses 302 generated by laser 110 with respect to the states of SLM 130 indicated in the top panel. More specifically, each pulse 302 is fired by laser 110 when SLM 130 is holding in a steady state of the respective redundant pattern 132. Note that laser 110 does not illuminate SLM 130 when the SLM is transitioning from one redundant pattern 132 to the next. As already explained above, illumination of each redundant pattern 132 results in the projection of a respective copy of substantially the same perceived image, with different redundant patterns 132 producing different speckle patterns. At a laser pulse rate higher than the flicker fusion rate (as is the case in FIG. 3), the viewer's eyes fuse the different speckle patterns, which results in a corresponding speckle-contrast reduction.

One skilled in the art will appreciate that, for the projection of multi-color images, the projection method graphically shown in FIG. 3 can be applied to each of the series of single color images, e.g., red, green, and blue, projected to produce a perceived multi-color image. Laser pulses having different colors can be appropriately interleaved as known in the art, wherein, for each laser pulse, SLM 130 is appropriately configured to hold a respective redundant pattern 132 corresponding to a respective monochromatic projected image. Also, by projecting an appropriate sequence of still images, some embodiments of the system 100 may be used to project moving pictures, such as movies or TV programs.

Figure 4:
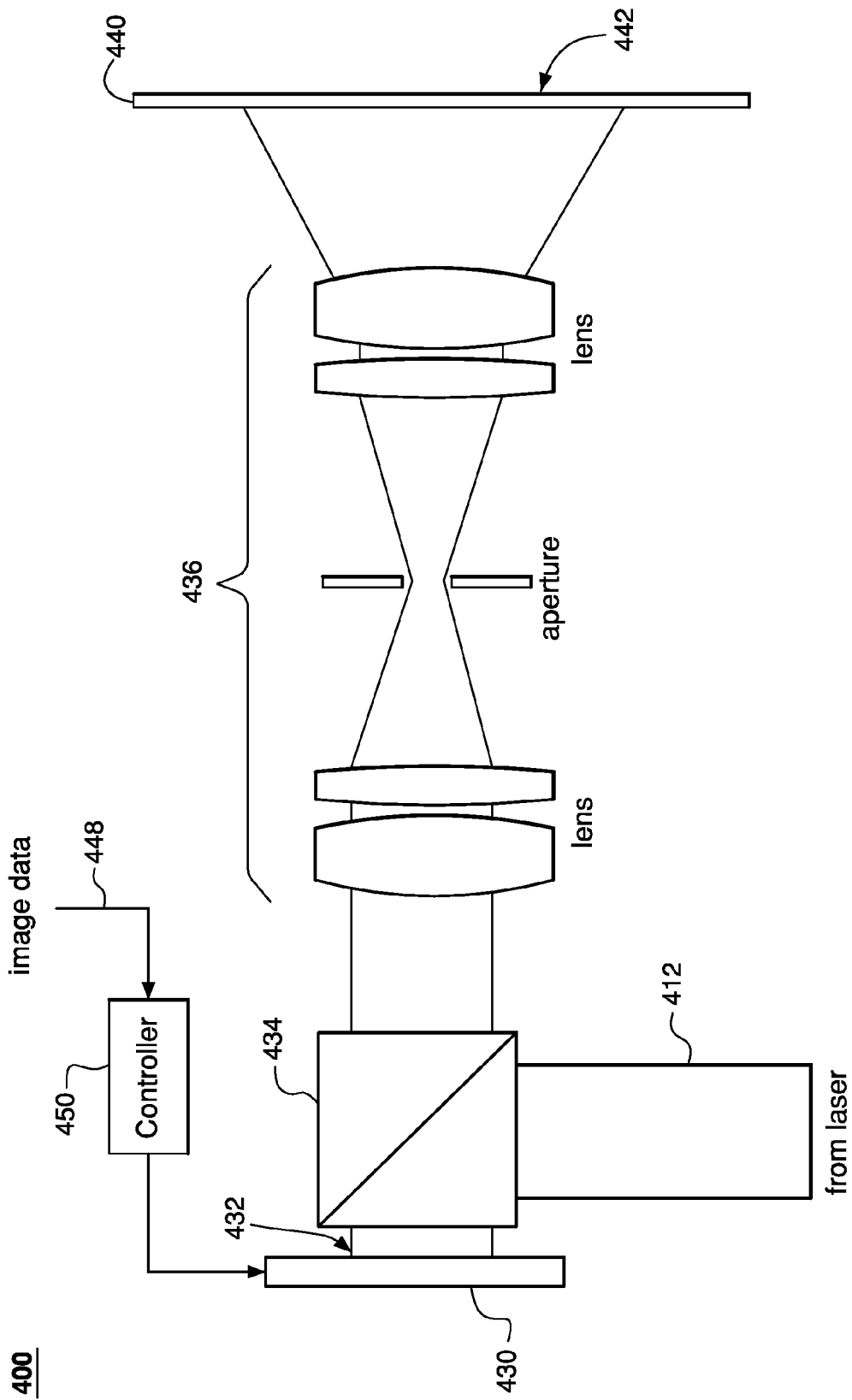
FIG. 4 shows a block diagram of a laser projection system according to another embodiment of the invention.

FIG. 4 shows a block diagram of a laser projection system 400 according to another embodiment of the invention. Unlike system 100 of FIG. 1, which projects images using a diffracted beam of light and holographic imaging principles, the individual mirrors of system 400 specularly reflect incident light for imaging. For example, a polarization beam splitter (PBS) 434 directs a beam 412 of light generated by a laser (not shown) toward an SLM 430. Based on image data 448, a controller 450 configures SLM 430 to display a corresponding spatial modulation pattern 432. Pattern 432 spatially modulates the impinging light and the resulting spatially modulated beam is reflected back toward PBS 434, which passes it toward relay optics 436. Relay optics 436 projects the received beam onto a screen 440 to form a corresponding projected image 442 thereon.

Because system 400 is designed to perform direct imaging, the relationship between the pixels of pattern 432 and the pixels of image 442 is relatively direct and straightforward. For example, if a pixel of pattern 432 reflects substantially no light, then the corresponding pixel of image 442 on screen 440 is relatively dark. Similarly, if a pixel of pattern 432 reflects light very effectively, then the corresponding pixel of image 442 is relatively bright.

In one embodiment, arrayed MEMS device 200 (FIG. 2) is used as SLM 430. More specifically, mirror 204 is binned into logical pixels, each logical pixel having an n×k block of plates 250, where n and k are positive integers, and at least one of n and k is greater than one. For illustration purposes, let us consider a case of n=1 and k=2, in which case each logical pixel has two plates 250. Suppose that the electro-mechanical actuators of both of these two plates 250 are not biased and the plates are aligned with one another, i.e., located at the same distance from the substrate plane (the plane having stationary electrodes 210, see FIG. 2). In the far field (e.g., at screen 440), light specularly reflected from the two plates 250 so positioned interferes constructively on the image pixel of image 442 corresponding to the two plates such that the image pixel is relatively brightly illuminated. Suppose now that the electro-mechanical actuator of one of the two plates 250 is biased so that the plate is displaced with respect to the other plate by $\lambda/4$, where $\lambda$ is the wavelength of beam 412. Now, in the far field (e.g., at screen 440), light specularly reflected from the two plates interferes destructively such that the pixel of image 442 corresponding to the two plates is relatively poorly illuminated, i.e., is relatively dark. One skilled in the art will appreciate that any intermediate brightness between the minimum (dark) and the maximum (bright) values can be obtained by offsetting the two plates with respect to one another by an appropriate distance between, e.g., zero and $\lambda/4$. Thus, by controlling the relative positions of plates 250 in the logical pixel, one can control the brightness of the corresponding pixel in image 442.

When a logical pixel of mirror 204 has a relatively large number of plates 250, e.g., a 4×4 block of plates 250, and the desired brightness of the corresponding pixel in image 442 is an intermediate brightness (e.g., brighter than zero but dimmer than the maximum brightness achievable in system 400), the logical pixel can be configured (have its plates 250 positioned) in many different ways to generate that desired brightness. Thus, there are a plurality of different patterns 432, each of which can be used in system 400 to project a copy of the same image 442 onto screen 440. Hereinafter, such different suitable patterns 432 representing the same image 442 are referred to as redundant patterns. One skilled in the art will appreciate that, although generated in a different manner, redundant patterns 432 in system 400 are analogous to redundant patterns 132 in system 100. Similar to redundant patterns 132, redundant patterns 432 are independent of one another. As such, each of redundant patterns 432 will create a different speckle configuration in image 442 while the image itself will remain substantially unchanged. If a plurality of redundant patterns 432 are projected on a viewing screen within a time interval that is shorter than or equal to the reciprocal flicker fusion rate, then a corresponding speckle-configuration averaging will occur in the eye, thereby effecting speckle-contrast reduction.

Given the above-explained analogy between redundant patterns 132 and 432, the method of reducing speckle graphically illustrated in FIG. 3 can be used to reduce speckle in image 442 according to another embodiment of the invention. More specifically, based on image data 448 specifying a still frame, controller 450 computes N redundant patterns 432 corresponding to that still frame. For the holding time of each redundant pattern 432 (duration of line 332 in FIG. 3), SLM 430 displays the redundant pattern by keeping its pixels in the respective steady states. While holding each redundant pattern 432, SLM 430 receives the respective laser pulse 302 (FIG. 3) from beam 412. As already explained above, because different copies of image 442 corresponding to different redundant patterns 432 have different speckle patterns, the viewer's eyes will fuse those image copies into a single image characterized by a reduced speckle contrast value compared to that of any individual image copy.

In another embodiment, an arrayed MEMS device having tilting or rotating mirrors can be used as SLM 430. Suitable arrayed MEMS devices are disclosed, for example, in commonly owned U.S. Pat. Nos. 7,099,063, 6,984,917, and 6,876,484, each of which is incorporated herein by reference in its entirety. Similar to mirror 204 (FIG. 2), an array of rotating mirrors is binned into logical pixels, each logical pixel having a plurality of individually addressable mirrors. When a logical pixel has a relatively large number of individually addressable mirrors, the desired brightness of the corresponding pixel in image 442 can be achieved by rotating some of the mirrors in the logical pixel to deflect light away from screen 440, while orienting the remaining mirrors in the logical pixel to direct light toward the screen. One skilled in the art will appreciate that each logical pixel can be configured (i.e., have its individual mirrors oriented) in many different ways to generate substantially the same brightness in the respective pixel in image 442. Thus, similar to the above-discussed embodiment with piston mirrors, there can be a plurality of different redundant patterns 432 in an embodiment with rotating mirrors, each of which patterns can be used to project the same perceived image 442 onto screen 440. As already explained above, if a plurality of redundant patterns 432 are projected on a viewing screen within a time interval that is shorter than or equal to the reciprocal flicker fusion rate, then a corresponding speckle-configuration averaging will occur in the eye, thereby effecting speckle-contrast reduction.

Figure 5:
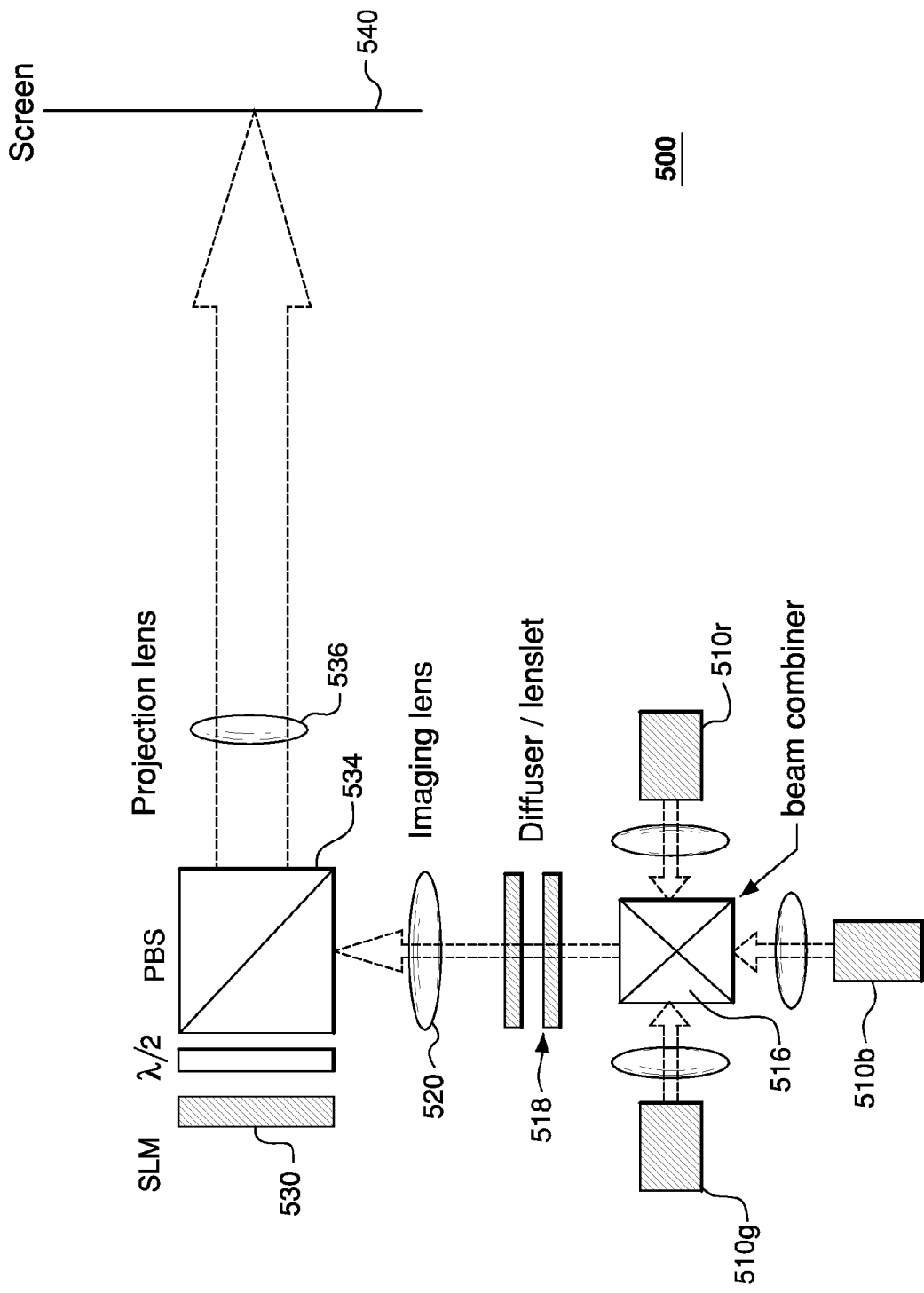
FIG. 5 shows a block diagram of a laser projection system according to yet another embodiment of the invention.

FIG. 5 shows a block diagram of a laser projection system 500 according to yet another embodiment of the invention. Similar to system 400 (FIG. 4), system 500 uses its spatial light modulator 530 as an amplitude (intensity) modulator. More specifically, each pixel of an SLM 530 is directly imaged by a projection lens 536 onto a screen 540, with the SLM illuminated, through a beam combiner 516, an imaging lens 520, and a PBS 534, by the light generated by one or more of lasers 510r, 510g, and 510b. Speckle mitigation in system 500 is effected by phase and angle diversities introduced in the illuminator optics, i.e., in the optical path between lasers 510 and SLM 530. For example, a diffuser, a lenslet array, or a phase mask, which are schematically shown as an optical element 518 positioned between beam combiner 516 and lens 520, introduces a distortion on the optical beam. Optical element 518 moves in a periodic or non-periodic manner to distort the optical front of the beam directed toward SLM 530. Speckle reduction is achieved by the introduction of path length differences within the beam that create mutually incoherent optical beams incident onto SLM 530 under diverse angles. In a preferred embodiment, optical element 518 introduces reciprocal path length differences that are longer than the coherence length of lasers 510. These path length differences produce substantially incoherent beams and therefore additional mechanical motion of or within SLM 530 may not be necessary. Lasers 510 may be specially designed or configured to have a relatively short coherence length. For example, the coherence length can be reduced by imposing special operating conditions or modulating the driving current over time.

While this invention has been described with reference to illustrative embodiments, this description is not intended to be construed in a limiting sense. Although certain embodiments of the invention have been described in reference to arrayed device 200 (FIG. 2), the invention can also be practiced with other suitable spatial light modulators, e.g., those employing the LCD technology. Although the method of FIG. 3 has been described in reference to the consecutive display of N different redundant patterns 132 or 432, some or all redundant patterns can be displayed multiple times during time interval $T_0$ in any selected order, including that produced by circularly cycling some or all redundant patterns. Embodiments of the speckle reduction method of the invention can be used separately or, as appropriate, in combination with other speckle reduction methods, e.g., those employing angle, polarization, and/or wavelength diversities. Various modifications of the described embodiments, as well as other embodiments of the invention, which are apparent to persons skilled in the art to which the invention pertains are deemed to lie within the principle and scope of the invention as expressed in the following claims.

Certain embodiments of the invention may employ vibration of the SLM as whole using translation or a rocking mode of motion. Alternatively, a relatively large mirror can be used to direct light from lasers 510 to SLM 530. One skilled in the art will appreciate that, by vibrating that relatively large mirror one can produce a speckle reduction effect substantially similar to that produced by the vibration of the SLM as a whole.

For the purposes of this specification, a MEMS device is an electrically controlled mechanical device having two or more parts adapted to move relative to one another, where the motion is caused by mechanical, electrical, and/or magnetic interactions. MEMS devices may be fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. Examples of MEMS devices may include, without limitation, NEMS (nano-electromechanical systems) devices and/or MOEMS (micro-opto-electromechanical systems) devices.

Although the present invention has been described in the context of implementation as MEMS devices, the present invention can in theory be implemented at any scale, including scales larger than micro-scale, e.g., greater than 10 µm.

Unless explicitly stated otherwise, each numerical value and range herein should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention.

We claim:

1. An apparatus, comprising:
a configurable spatial light modulator (SLM) to redirect illumination from a laser with a plurality of spatial patterns such that the redirected illumination projects an image on a viewing screen; and
a controller adapted to drive the SLM to display a temporal sequence of spatial patterns selected from said plurality to mitigate speckle in the projected image, wherein:
the SLM comprises an array of individually addressable MEMS-controlled mirrors supported over a substrate; and
the SLM is adapted to translate or rotate selected ones of said mirrors responsive to signals from the controller to change the display spatial pattern.

2. The invention of claim 1, wherein:
each individually addressable MEMS-controlled mirror is adapted to translate with respect to the substrate; and
the spatial pattern displayed by the SLM is defined by positions of said individually addressable mirrors with respect to the substrate.

3. The invention of claim 1, wherein:
each individually addressable MEMS-controlled mirror is adapted to rotate with respect to the substrate; and
the spatial modulation pattern displayed by the SLM is defined by orientations of said individually addressable mirrors with respect to the substrate.

4. The invention of claim 1, wherein the mirrors are adapted to redirect said illumination via diffraction.

5. The invention of claim 1, wherein the mirrors are adapted to redirect said illumination via specular reflection.

6. The invention of claim 1, wherein the SLM is adapted to mechanically vibrate with respect to the screen.

7. The invention of claim 1, further comprising an optical element adapted to (i) direct a beam of light from the laser to the SLM and (ii) vibrate to cause said beam to vibrate with respect to the SLM.

8. The invention of claim 1, wherein the controller is adapted to change the spatial patterns at a rate of about 20 Hz or more.

9. The invention of claim 1, wherein said plurality comprises two or more redundant spatial modulation patterns that cause the SLM to produce substantially similar images characterized by different speckle patterns.

10. The invention of claim 1, further comprising the laser.

11. The invention of claim 10, wherein:
the laser is adapted to generate light of at least two different colors for generating multi-color images; and
the apparatus is configured to produce a sequence in which images of different colors are alternated.

12. The invention of claim 1, wherein:
the laser is adapted to generate pulsed light; and
in response to the controller, the SLM is adapted to:
hold steady a respective displayed spatial pattern for a respective laser pulse; and
change the displayed spatial patterns in time periods between laser pulses.

13. A method of reducing speckle, comprising:
redirecting illumination from a laser with a plurality of spatial patterns displayed by a configurable spatial light modulator (SLM) such that the redirected illumination projects an image on a viewing screen; and
driving the SLM to display a temporal sequence of spatial patterns selected from said plurality to mitigate speckle in the projected image, wherein:
the SLM comprises an array of individually addressable MEMS-controlled mirrors supported over a substrate; and
the SLM is adapted to translate or rotate selected ones of said mirrors responsive to signals from the controller to change the displayed spatial modulation pattern.

14. The invention of claim 13, wherein:
each individually addressable MEMS-controlled mirror is adapted to translate with respect to the substrate; and
the spatial modulation pattern displayed by the SLM is defined by positions of said individually addressable mirrors with respect to the substrate.

15. The invention of claim 13, wherein:
each individually addressable MEMS-controlled mirror is adapted to rotate with respect to the substrate; and
the spatial modulation pattern displayed by the SLM is defined by orientations of said individually addressable mirrors with respect to the substrate.

16. The invention of claim 13, further comprising mechanically vibrating the SLM with respect to the screen.

17. The invention of claim 13, further comprising:
directing a beam of light from the laser to the SLM via an optical element; and
vibrating the optical element to cause said beam to vibrate with respect to the SLM.

18. The invention of claim 13, further comprising changing the spatial patterns at a rate of about 20 Hz or more.

19. An apparatus, comprising:
a configurable spatial light modulator (SLM) to redirect illumination from a laser with a plurality of spatial patterns such that the redirected illumination projects an image on a viewing screen; and
a controller adapted to drive the SLM to display a temporal sequence of spatial patterns selected from said plurality to mitigate speckle in the projected image, wherein the SLM is adapted to mechanically vibrate with respect to the screen.

20. An apparatus, comprising:
a configurable spatial light modulator (SLM) to redirect illumination from a laser with a plurality of spatial patterns such that the redirected illumination projects an image on a viewing screen;
a controller adapted to drive the SLM to display a temporal sequence of spatial patterns selected from said plurality to mitigate speckle in the projected image; and
an optical element adapted to (i) direct a beam of light from the laser to the SLM and (ii) vibrate to cause said beam to vibrate with respect to the SLM.

21. An apparatus, comprising:
a configurable spatial light modulator (SLM) to redirect illumination from a laser with a plurality of spatial patterns such that the redirected illumination projects an image on a viewing screen; and
a controller adapted to drive the SLM to display a temporal sequence of spatial patterns selected from said plurality to mitigate speckle in the projected image, wherein the controller is adapted to change the spatial patterns at a rate of about 20 Hz or more.

22. An apparatus, comprising:
a configurable spatial light modulator (SLM) to redirect illumination from a laser with a plurality of spatial patterns such that the redirected illumination projects an image on a viewing screen; and a controller adapted to drive the SLM to display a temporal sequence of spatial patterns selected from said plurality to mitigate speckle in the projected image, wherein said plurality comprises two or more redundant spatial modulation patterns that cause the SLM to produce substantially similar images characterized by different speckle patterns.

23. An apparatus, comprising:

a laser;

a configurable spatial light modulator (SLM) to redirect illumination from the laser with a plurality of spatial patterns such that the redirected illumination projects an image on a viewing screen; and a controller adapted to drive the SLM to display a temporal sequence of spatial patterns selected from said plurality to mitigate speckle in the projected image, wherein:

the laser is adapted to generate light of at least two different colors for generating multi-color images; and the apparatus is configured to produce a sequence in which images of different colors are alternated.

24. An apparatus:

a configurable spatial light modulator (SLM) to redirect illumination from a laser with a plurality of spatial patterns such that the redirected illumination projects an image on a viewing screen; and a controller adapted to drive the SLM to display a temporal sequence of spatial patterns selected from said plurality to mitigate speckle in the projected image, wherein:

the laser is adapted to generate pulsed light; and in response to the controller, the SLM is adapted to:

hold steady a respective displayed spatial pattern for a respective laser pulse; and change the displayed spatial patterns in time periods between laser pulses.

25. A method of reducing speckle, comprising:

redirecting illumination from a laser with a plurality of spatial patterns displayed by a configurable spatial light modulator (SLM) such that the redirected illumination projects an image on a viewing screen;

driving the SLM to display a temporal sequence of spatial patterns selected from said plurality to mitigate speckle in the projected image; and mechanically vibrating the SLM with respect to the screen.

26. A method of reducing speckle, comprising:

redirecting illumination from a laser with a plurality of spatial patterns displayed by a configurable spatial light modulator (SLM) such that the redirected illumination projects an image on a viewing screen;

driving the SLM to display a temporal sequence of spatial patterns selected from said plurality to mitigate speckle in the projected image;

directing a beam of light from the laser to the SLM via an optical element; and vibrating the optical element to cause said beam to vibrate with respect to the SLM.

27. A method of reducing speckle, comprising:

redirecting illumination from a laser with a plurality of spatial patterns displayed by a configurable spatial light modulator (SLM) such that the redirected illumination projects an image on a viewing screen;

driving the SLM to display a temporal sequence of spatial patterns selected from said plurality to mitigate speckle in the projected image; and changing the spatial patterns at a rate of about 20 Hz or more.

* * * * *